United States Patent
Vaez-Iravani et al.

(10) Patent No.: US 7,319,229 B2
(45) Date of Patent: Jan. 15, 2008

(54) ILLUMINATION APPARATUS AND METHODS

(75) Inventors: Mehdi Vaez-Iravani, Los Gatos, CA (US); Guoheng Zhao, Milpitas, CA (US); Stanley E. Stokowski, Danville, CA (US)

(73) Assignee: KLA-Tencor Technologies Corporation, Milpitas, CA (US)

( * ) Notice: Subject to any disclaimer, the term of this patent is extended or adjusted under 35 U.S.C. 154(b) by 386 days.

(21) Appl. No.: 11/015,852

(22) Filed: Dec. 15, 2004

(65) Prior Publication Data

US 2005/0141810 A1    Jun. 30, 2005

Related U.S. Application Data

(60) Provisional application No. 60/533,741, filed on Dec. 29, 2003.

(51) Int. Cl.
*G01J 1/42* (2006.01)
*G08B 5/36* (2006.01)
*G02B 6/32* (2006.01)

(52) U.S. Cl. ............... 250/372; 340/815.77; 385/33

(58) Field of Classification Search .............. 250/372; 356/237.2, 237.3, 237.4, 237.5; 340/815.77
See application file for complete search history.

(56) References Cited

U.S. PATENT DOCUMENTS

| | | | |
|---|---|---|---|
| 3,909,823 A * | 9/1975 | Knowlton | 345/104 |
| 4,677,473 A * | 6/1987 | Okamoto et al. | 348/126 |
| 5,125,741 A * | 6/1992 | Okada et al. | 356/237.2 |
| 6,369,888 B1 * | 4/2002 | Karpol et al. | 356/237.5 |
| 6,578,961 B2 | 6/2003 | Vaez-Iravani | |
| 6,657,715 B2 | 12/2003 | Vaez-Iravani | |
| 7,116,413 B2 * | 10/2006 | Vaez-Iravani | 356/237.2 |
| 2003/0023153 A1 * | 1/2003 | Izatt et al. | 600/407 |

(Continued)

OTHER PUBLICATIONS

Togashi et al., "Generation of vacuum-ultraviolet light by an optically contacted, prism-coupled $KBe_2BO_3F_2$ crystal", Feb. 15, 2003, Optic Letters, vol. 28, No. 4, pp. 254-256.

(Continued)

*Primary Examiner*—David Porta
*Assistant Examiner*—Faye Boosalis
(74) *Attorney, Agent, or Firm*—Beyer Weaver LLP

(57) ABSTRACT

Disclosed are apparatus and methods for illuminating a sample, e.g., during an inspection of such sample for defects. In one aspect, the illumination apparatus includes a bundle of fibers that each has a first end and a second end. The illumination apparatus further includes an illumination selector for selectively transmitting one or more incident beams into one or more corresponding first ends of the optical fibers so that the selected one or more incident beams are output from one or more corresponding second ends of the fibers. The illumination apparatus also includes a lens arrangement for receiving the selected one or more incidents beams output from the corresponding one or more second ends of the fibers and directing the selected one or more incident beams towards the sample. The lens arrangement and the fibers are arranged with respect to each other so as to image an imaging plane of the sample at the second ends of the fibers. In one aspect, the incident beams are laser beams. In a specific application of the invention, the sample is selected from a group consisting of a semiconductor device, a semiconductor wafer, and a semiconductor reticle.

43 Claims, 11 Drawing Sheets

U.S. PATENT DOCUMENTS

2004/0146295 A1* 7/2004 Furman et al. ............... 398/9
2004/0207855 A1* 10/2004 Brady et al. ............... 356/451
2005/0041226 A1* 2/2005 Tanaka et al. ............... 355/53
2005/0141810 A1* 6/2005 Vaez-Iravani et al. ........ 385/33

OTHER PUBLICATIONS

Chen et al., "Second-harmonic generation from a $KBe_2BO_3F_2$ crystal in the deep ultraviolet", Apr. 15, 2002, vol. 27, No. 8, Optic Letters, pp. 637-639.

Kanai et al., "Generation of vacuum-ultraviolet light below 160 nm in a KBBF crystal by the fifth harmonic of a single-mode Ti:sapphire laser", vol. 21, No. 2, Feb. 2004, J. Optical Society of America, pp. 370-375.

PCT Search Report, Application No. PCT/US04/43129, dated Sep. 23, 2005.

PCT Written Opinion, Application No. PCT/US04/43129, dated Sep. 23, 2005.

U.S. Appl. No. 11/013,976, filed Dec. 14, 2004.

* cited by examiner

ILLUMINATION APPARATUS AND METHODS

CROSS REFERENCE TO RELATED PATENT APPLICATION

This application claims priority of U.S. Provisional Patent Application No. 60/533,741, entitled ILLUMINATION APPARATUS AND METHODS, filed 29 Dec. 2003 by Mehdi Vaez-Iravani, et al., which application is incorporated herein by reference in its entirety for all purposes.

BACKGROUND OF THE INVENTION

This invention pertains to apparatus and methods for illuminating a sample, such as a semiconductor wafer or photomask in an inspection system. It also pertains to apparatus and methods for reducing speckle effects during such illumination and inspection.

A diverse number and type of inspection systems are available for inspecting samples for defects. Lasers are often used as light sources in many inspection systems to detect defects on wafers or photomasks. Lasers provide one of the most efficient illumination methods due to their extremely high brightness.

One of the downsides, however, of using lasers is that the high spatial and temporal coherency of laser light can cause a ringing effect when imaging patterns on the surface of a sample, or speckle when the surface features are random. The ringing effect or speckle can severely degrade image quality and introduce excessive noise, therefore reduce sensitivity for detecting defects. Comprehensive discussions about interference effects such as ringing and speckle phenomena can be found in "Fourier Optics", by J. W. Goodman, McGraw-Hill, and "Statistical Optics", also by J. W. Goodman, Wiley-Interscience. This illumination spatial coherence effect is especially strong in a bright field imaging mode, where a significant portion of the reflected light needs to impinge on the detectors.

These deleterious image effects can be improved by reducing the spatial coherence of the laser light that is used to illuminate the object being imaged. One conventional technique of providing partially incoherent laser light involves the use of a rotating diffuser. A rotating diffuser typically consists of a rotating ground-glass screen that is introduced into the path of the laser beam before it reaches the object being imaged. The rotating diffuser introduces random phase variations into the incident laser beam, thereby reducing the spatial coherence of the beam. As the diffuser rotates, a detector can collect images of the object from independent views or perspectives. The detector, in turn, can integrate the independent inspection views to effectively synthesize an incoherent illumination of the object being imaged. One problem associated with using a rotating diffuser involves illumination efficiency. Diffusers are generally low efficiency because of excessive scattering of light.

In certain applications, it is also frequently required that the inspection system have configurable illumination and imaging configurations. The illumination and imaging configuration will be set to optimize the capture of different characteristics of defects or defect types. That is, different illumination and imaging configurations are more suitable for different types of defect inspections. Two broad categories of inspection configurations include bright field and dark field inspection. In general, the illumination and collection beam profiles are adjusted to achieve different inspection modes. In other words, different portions or angles of the incident or collection beam are blocked or transmitted. For example, in ring dark field mode, more than 75% of light can be lost due to the use of annular apertures to block the complementary portions of illumination pupil and imaging pupil. This can be a serious concern since the amount of incident light as part of the overall light budget for most laser inspection systems is limited. This is especially true for deep UV inspection systems where the light budget is extremely restricted.

In light of the foregoing, improved mechanisms for illuminating a sample, such as during an inspection, are needed.

SUMMARY OF THE INVENTION

Accordingly, the present invention provides methods and apparatus for illuminating a sample, e.g., during an inspection of such sample for defects. In one aspect, the illumination apparatus includes a bundle of fibers that each has a first end and a second end. The illumination apparatus further includes an illumination selector for selectively transmitting one or more incident beams into one or more corresponding first ends of the optical fibers so that the selected one or more incident beams are output from one or more corresponding second ends of the fibers. The illumination apparatus also includes a lens arrangement for receiving the selected one or more incidents beams output from the corresponding one or more second ends of the fibers and directing the selected one or more incident beams towards the sample. The lens arrangement and the fibers are arranged with respect to each other so as to image a Fourier plane (the back focal plane of the objective) of the sample at the second ends of the fibers. In one aspect, the incident beams are laser beams. In a specific application of the invention, the sample is selected from a group consisting of a semiconductor device, a semiconductor wafer, and a semiconductor reticle.

In a specific implementation, the illumination selector is formed from a plurality of illumination sources. Each illumination source is positioned at a corresponding first end of a one of the fibers and each illumination source is configurable to turn off or on. The selector also includes a controller operable to selectively turn the illumination sources on or off.

In another implementation, the illumination selector includes a plurality of illumination sources, wherein each illumination source is configurable to turn off and on and a number of the illumination sources is less than a number of the fibers and a movement mechanism for positioning each of the illumination sources near a one of the first ends of the fibers. In this implementation, the controller is operable to selectively turn the illumination sources on or off and, as well as to cause the movement mechanism to position the illumination sources at selected first ends of the fibers.

In an alternative implementation, the illumination selector has a single beam generator for outputting a single incident beam and a movable substrate comprising a plurality of mask areas, wherein each different mask area includes a different set of transparent and opaque portions and each mask area is sized to cover a substantial portion of the single incident beam's cross section. The selector further includes a movement mechanism for moving the movable substrate so as to position a selected one of the mask areas of the substrate over the single incident beam's cross section and a controller operable to cause the movement mechanism to position a selected one of the mask areas of the substrate over the incident beam's cross section. In one aspect, the single beam generator is a gas laser generator.

In yet another illumination selector embodiment, the selector includes a single beam generator for outputting a single incident laser beam, a diffractive optical element for receiving the single incident beam and outputting a plurality of incident beams, and a lens element for receiving the incident beams and directing them each towards a one of the first fiber ends. The selector further includes a plurality of shutters for receiving the incident beams and configurable to a closed and an open position and a controller operable to open or close one or more selected shutters. In one aspect, the lens element is an array of lenslets.

In a further embodiment, the illumination apparatus includes a fiber modulator for alter the length of the fibers so as to reduce speckle noise in the one or more incident beams. In a specific embodiment, the fiber modulator is a piezoelectric modulator coupled to a portion of the fibers having a voltage generator for applying a voltage difference across the piezoelectric modulator to selectively altering a size of the piezoelectric modulator and thereby stretch the coupled fibers. In a further aspect, the piezoelectric modulator is rectangular shaped and coupled to the fibers with epoxy. Alternatively, the piezoelectric modulator may have a tube shape around which the fibers are wrapped.

In an alternative embodiment, the illumination apparatus includes a rotating diffuser for receiving the incident beams and outputting the incident beams with altered phases so as to reduce speckle noise in the incident beams.

Another aspect of the invention provides an inspection system that includes the illumination apparatus described above as well as at least a second lens arrangement for directing one or more output beams emanating from the sample in response to the one or more incident beams and a detector for receiving the one or more incident beams and generating an image or signal based on the one or output beams. The inspection system may have a single detector or it may have any number of detectors, depending on the particular application and system requirements. For example, it may be desirable to have more than one detector to provide simultaneous collection of output light from multiple angles.

In a further inspection implementation, the controller is further operable to analyze the image or signal from the detector to thereby determine whether the sample has any defects. In yet another application, the controller is further operable to analyze the image or signal from the detector to thereby characterize the sample. In one embodiment, the second lens arrangement includes an imaging aperture that is configurable to transmit selected portions of the output beams' profile. The imaging aperture is at least configurable to transmit all of the output beams and to transmit only a nonspecular portion of the output beams, and wherein the illumination selector is operable to transmit all of the incident beams onto all of the first fiber ends and to transmit an outer ring portion of the incident beams which are suitable for a dark field mode inspection onto an outer ring portion of first fiber ends. In an alternative inspection system, an illumination source for directing a single incident beam towards the sample is provided. The illuminator source is configurable on or off.

In yet another embodiment, an illumination apparatus includes a plurality of optical fibers that each has a first end and a second end and a plurality of illumination sources each adjacent to a corresponding first fiber end and being operable to transmit an incident beams onto a corresponding first fiber end so that the incident beam is output from the corresponding second fiber end. The illumination apparatus also includes a lens arrangement for receiving the incidents beams output from the second fiber ends and directing the incident beams towards the sample, wherein the lens arrangement and the fibers are arranged with respect to each other so as to image a Fourier plane of the sample at the second ends of the fibers, and a fiber modulator for altering the length of the fibers so as to substantially eliminate speckle noise in the one or more incident beams. In this embodiment, an illumination selector for transmitting incident beams onto selected fibers as described above is optional.

In a further implementation, the apparatus further includes a plurality of light generators for producing the incident beams each having a wavelength between about 375 nm and about 405 nm and a plurality of single stage non-linear crystals that are each positioned for receiving a corresponding one or two of the incident beams from a corresponding one or two of the light generators. Each crystal is arranged to either double the frequency of one received incident beam or to sum the frequencies of the two received incident beams to a wavelength between about 187.5 nm and about 202.5 nm and then output the incident beam towards the illumination selector. By way of examples, the crystals may take the form of KBBF ($KBe_2BO_3F_2$) or BBO (beta-$BaB2O4$) crystals. In one implementation, the light generators are GaN-based laser diodes. Also, the light generators can be pulse or continuous type lasers in two example implementations.

In a further aspect, each crystal is positioned to receive one corresponding incident beam and arranged to double the frequency of the received corresponding one incident beam to a wavelength between about 187.5 nm and about 202.5 nm and then output the incident beam towards the illumination selector. In a further aspect, each crystal is part of an external cavity having a plurality of reflectors or prisms positioned to circulate the one corresponding incident beam between the reflectors or prisms and a dichroic element for transmitting at least a portion of the circulating one corresponding incident beam and for reflecting the incident beam having a wavelength between about 187.5 nm and about 202.5 nm towards the illumination selector. This same each crystal is positioned within a path of the circulating one corresponding incident beam.

In another embodiment, each crystal is positioned to received two of the corresponding incident beams and is arranged to sum the frequencies of the received corresponding two incident beams to a wavelength between about 187.5 nm and about 202.5 nm and then output the incident beam towards the illumination selector.

Another aspect of the invention includes methods of, in addition to illuminating a sample using any of the previously described illumination apparatus or inspection system embodiments.

In another aspect, the invention pertains to an apparatus for inspecting a specimen. The apparatus includes one or two light generators for producing one or two incident beams each having a wavelength between about 375 nm and about 405 nm and a single stage non-linear crystal that is arranged to either (i) receive the one incident beam from one light generator and double the frequency of the one incident beam or (ii) receive two incident beams from two light generators and sum the frequencies of the two incident beams. The single stage non-linear crystal is further arranged to output an incident beam having a wavelength between about 187.5 nm and about 202.5 nm towards the illumination selector. The apparatus also includes a second lens arrangement arranged to receive the incident beam from the single stage non-linear crystal and direct the incident beam towards the specimen and a second lens arrangement for directing one or more output beams emanating from the specimen in response to the incident beam. The apparatus further includes a detector for receiving the one or more output beams and generating an image or signal based on the one or output beams.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Figure 1:
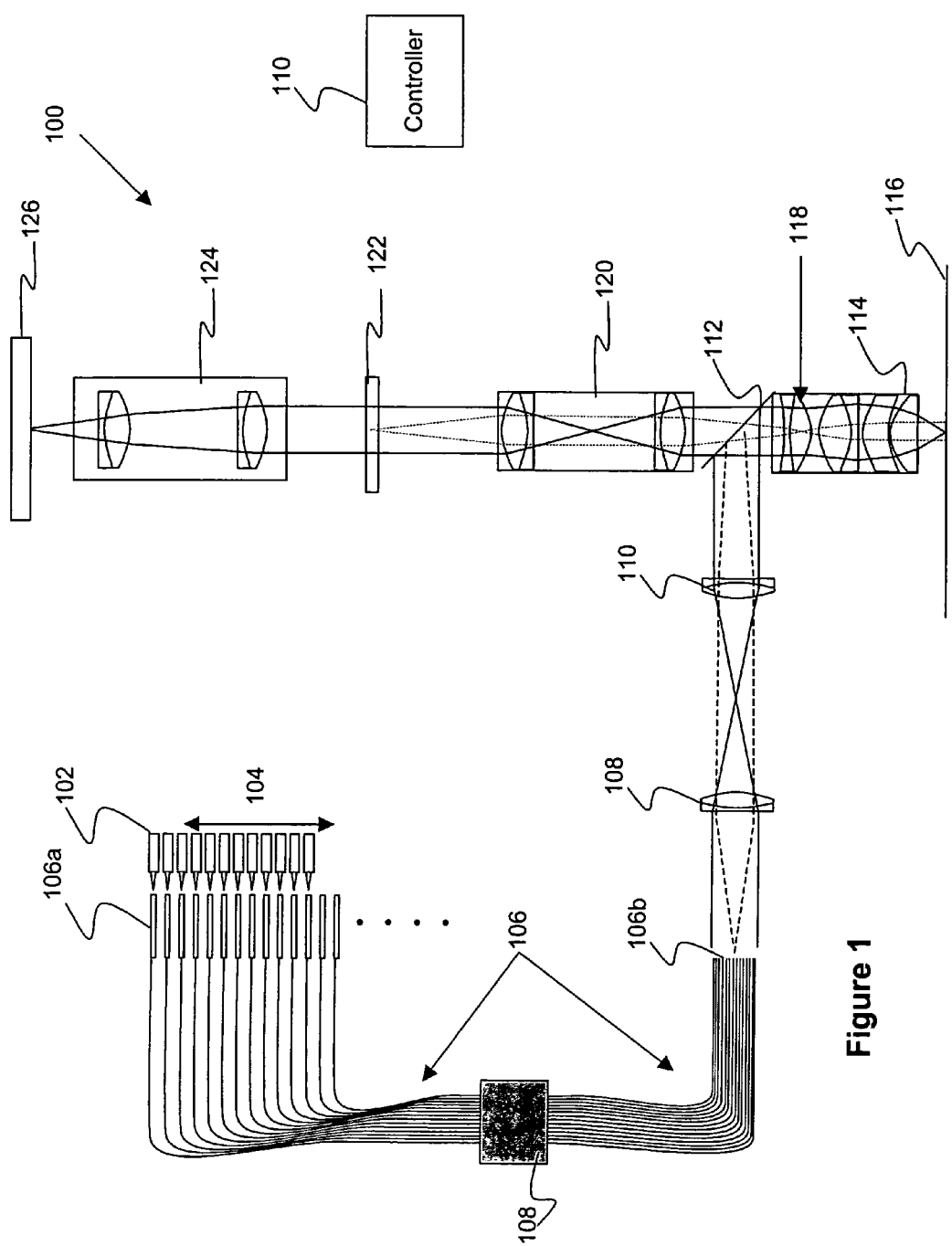
FIG. 1 is a diagrammatic representation of an inspection system having an illumination apparatus in accordance with one embodiment of the present invention.

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In general, embodiments of the present invention provide an illumination apparatus for illuminating a sample and use of the same. In one aspect, the illumination apparatus includes a plurality of optical fibers for receiving one or more incident beam(s) and outputting such beam(s), a lens arrangement for receiving the beam(s) and directing the beam(s) towards a sample, and an illumination selector for transmitting one or more incident beams on selected ones of the fibers. In other words, different numbers of fibers may be selected to transmit different numbers of incident beams towards the sample. The illumination apparatus may also include a spatial coherence reduction mechanism for reducing speckle noise in the incident beams. In a specific implementation, the illumination apparatus includes a fiber modulator for altering a length of a portion of the fibers so as to reduce speckle noise. In this aspect of the invention, the illumination selector is optional and the fiber modulator combined with the use of a plurality of fibers to transmit a fixed number of incident beams towards a sample provide an improvement over conventional mechanisms for reducing speckle noise.

The novel illumination apparatus embodiments of the present invention may also be incorporated into an optical inspection system for inspecting samples with one or more incident optical beams. In general, such a system also provides a detector for detecting beams emanated from the sample in response to the incident beam(s) provided by the illumination apparatus. Alternatively, the illumination apparatus of the present invention may be integrated within a microscopy system for imaging a sample.

In the following exemplary inspection systems, each incident beam may be in any suitable form of coherent light. For instance, more than one laser having different wavelengths including deep ultra violet, ultra violet, or visible light wavelengths can be used. Different wavelengths can be used to optimize for detecting defects with different characteristics, and a combination of several wavelengths can be advantageous for further reducing laser coherence and averaging out the effect of wafer film thickness variations. A dark field inspection is preferably performed with a very bright light source so as to detect small defects on a sample by analyzing only the scattered light.

Additionally, any suitable lens arrangement may be used to direct the incident beams towards the sample and direct the output beams emanating from the sample towards a detector. The output beams may be reflected or scattered from the sample or transmitted through the sample. Likewise, any suitable detector type or number of detection elements may be used to receive the output beams and provide an image or a signal based on the characteristics (e.g., intensity) of the received output beams.

The illumination apparatus of the present invention are especially suitable for inspecting semiconductor devices or wafers, as well as reticles or masks. Other types of samples which may be inspected or imaged using the illumination apparatus of the present invention include any surface, such as a flat panel display.

FIG. 1 is a diagrammatic representation of an inspection system 100 having an illumination apparatus in accordance with one embodiment of the present invention. As shown, the inspection system 100 includes a bundle of optical fibers 106, each having a first end 106a and a second end 106b. The inspection system 100 also includes an illumination selector for selectively transmitting one or more incident beams onto one or more first fiber ends 106a.

In the illustrated embodiment, the illumination selector includes a plurality of illumination sources 102 which are each configurable to be turned on or off and a controller 110 for causing selected ones of the illumination sources 102 to be turned on. In a specific implementation, each illumination source 102 is in the form of a laser diode. The illumination sources 102 are also adjacent to at least a portion of the first fiber ends 106a. By turning on selected illumination sources 102, the illumination sources 102 are also configurable to output one or more incident beams onto one or more selected first fiber end(s) 106a. In some configurations, an illumination source 102 may be turned off and not output an incident beam onto its adjacent, while another illumination source 102 may be turned on to output an incident beam onto its adjacent fiber.

When the number of illumination sources 102 is fewer than the number of fibers, the illumination sources 102 may be movable so as to be positioned adjacent with selected ones of the optical fibers ends 106a. As shown, each one of the illumination sources 102 move independently in directions 104.

The incident beam(s) pass through selected ones of the fibers 106 and are output through the second fiber ends 106b. The incident beam(s) then pass through a number of lenses which serve to relay the beam(s) towards a sample 116. In the illustrated embodiment, the incident beam(s) pass through lens 108 which collimates the incident beams and then through lens 110 which converges the incident beams. The incident beams are then received by beam splitter 112 which then reflects the incident beams through objective lens 114 which focuses the incident beams onto sample 116 at one or more incident angles. The second fiber ends 106b are imaged onto the back focal plane of the objective lens 114.

The fibers 106 may also be coupled with a fiber modulator 108 which operates to substantially eliminate the speckle noise which may be present in the incident beam(s) to thereby produce a more uniform, incoherent illumination. For example, the fiber modulator may be a piezoelectric modulator which operates to stretch the fibers so as to change the phase difference between the modes inside the multi-mode fibers to therefore reduce the spatial coherence to produce a speckle free illumination.

After the incident beam(s) impinge on the sample, the light is then reflected (and/or transmitted) and scattered from the sample 116, which is referred to herein as "output light.". The inspection system also includes any suitable lens arrangements for directing the output light towards a detector. In the illustrated embodiment, the output light pass through beam splitter 112, Fourier plane relay lens 120, imaging aperture 122, and zoon lens 124. The Fourier plane relay lens generally relays the Fourier plane of the sample to the imaging aperture 122. The imaging aperture 122 may be configured to block portions of the output beams. For instance, the aperture 122 is configured to pass all of output light within the objective numerical aperture in a bright field inspection mode, and configured to pass only the scattered light from the sample during a dark field inspection mode. A filter may also be placed at the imaging aperture 122 to block higher orders of the output beams so as to filter periodic structures from the detected signal.

After going through the imaging aperture 122, the output beams then pass through zoom lens 124 which serves to magnify the image of the sample 116. The output beams then impinge upon detector 126. By way of example, the detector may be in the form of a CCD (charge coupled device) or TDI (time delay integration) detector.

The controller 110 may be any suitable combination of software and hardware and is generally configured to control various components of the inspection system 100. For instance, the controller may control selective activation of the illumination sources 102, the fiber modulator 108 settings, the imaging aperture 122 settings, etc. The controller 110 may also receive the image or signal generated by the detector 126 and be configured to analyze the resulting image or signal to determine whether defects are present on the sample, characterize defects present on the sample, or otherwise characterize the sample.

The system 100 may also include a conventional illumination source (not shown), such as a broadband source, for generating one or more incident beams which are directed to the sample without being selectively transmitted onto one or more fibers. The conventional illumination source may be used for particular applications, such as thin film structures. The conventional illumination source may switch on or off to run concurrently or at a different time with respect to activation of selected fibers.

Referring back to FIG. 1, the second ends of 106b of the fibers 106 are preferably positioned such that the pupil plane of the objective lens is imaged at the second end 106b. That is, the second fiber ends 106b are positioned within the illumination pupil, which is the conjugate plane of the objective back focal plane 118. The second fiber ends 106b may be arranged in any particular shape so as to illuminate a particular one- or two-dimensional area of the sample 116 at one or more incident angles. In the illustrated embodiment, the second fiber ends are arranged in a tube shaped bundle having a circular cross section. FIGS. 2A through 2H each illustrate an arrangement of the second fiber ends 106b, where different ones of the fibers have either an adjacent illumination source which is turned on (shown as filled circle) or off (shown as open circle), in accordance with one embodiment of the present invention. In this implementation, the arrangement of the second fiber ends is substantially circular. Of course, any other shapes may be utilized.

Each fiber results in an incident beam having a particular angle with respect to the normal of the sample surface. For instance, the center fiber of a circular bundle results in an incident beam which is normal to the sample, while fiber in the outer ring of the fiber bundle may result in an incident beam having an oblique incident angle. Said in another way, the fibers can be arranged to form any illumination aperture shape and turned on and off so as to alter the angle of the incident plane waves relative to a plane of the sample.

Figure 2D:
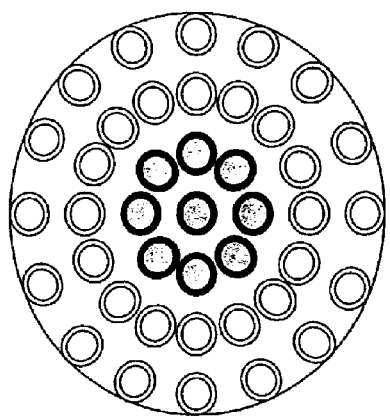
FIGS. 2A through 2H each illustrate a cross section of the fiber bundles of FIG. 1, where different ones of the fibers have either an adjacent illumination source which is turned on or off, in accordance with one embodiment of the present invention.
Figure 2H:
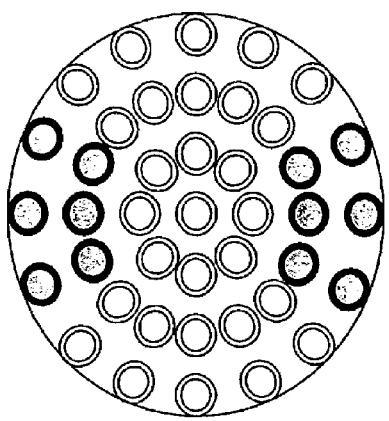
Figure 2C:
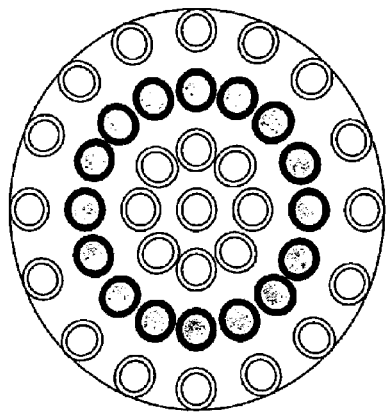
Figure 2G:
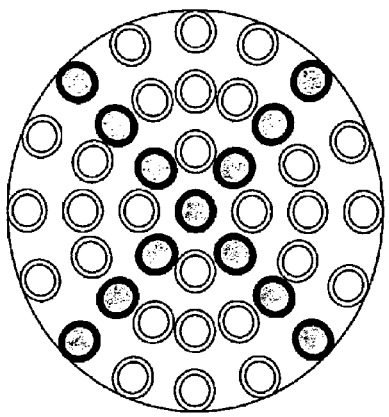
Figure 2B:
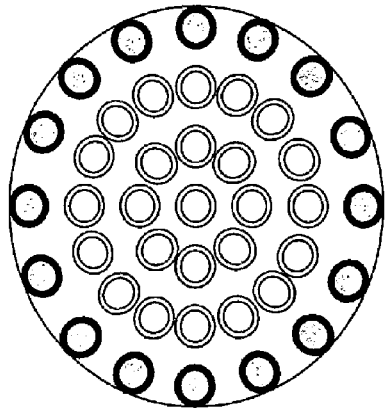
Figure 2F:
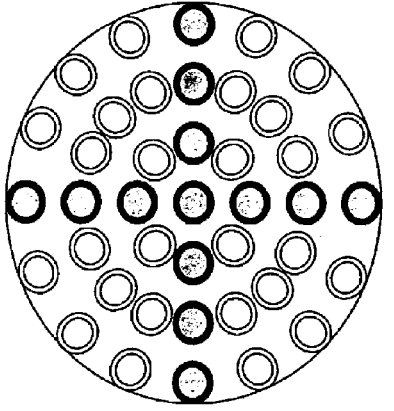
Figure 2A:
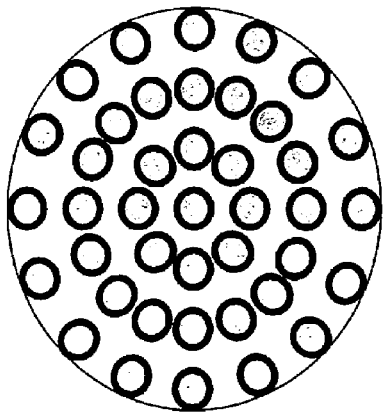
Figure 2E:
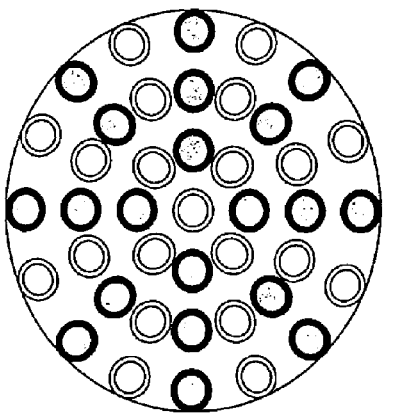

As shown, an incident beam may be selectively applied to one or more of the fibers within the fiber bundle. Each figure shows a particular configuration of the fiber bundle. In each figure, the fibers which are turned on are shown as a darker color than the fibers which are turned off. FIG. 2A shows an incident beam applied to and turned on for each one of the fibers. This configuration may be used, for example, in a bright field inspection. In contrast, FIG. 2B shows an incident beam on each of the fibers positioned along the outer circumference of the fiber bundle. This arrangement may be utilized for a dark field inspection. In this example, the imaging aperture would then be blocked so as to collect nonspecular light from the center of the aperture and not the outside ring. FIGS. 2C and 2D show two successively smaller ring portions of the fibers being activated, than FIG. 2B. FIGS. 2E, 2F, and 2G show different cross portions of the fibers being activated with FIG. 2E having 2 cross portions activated and FIGS. 2F and 2G having a single cross portion activated.

In general, any suitable arrangement of active ("on") and inactive ("off") fibers (and corresponding imaging aperture blockage) may be utilized and depends on the particular inspection or microscopy application. In one example illustrated in FIG. 2H, fibers are selectively activated so that incident beams impinge upon the sample at two opposite oblique angles along a single axis, such as the X-axis of the sample. The selection of the X-axis in relation to the sample is arbitrary. In this example, samples which have structures which are laid out in a mostly X-axis direction (for example, lines along the X-axis) may be effectively filtered from the inspection results. Of course, the fibers may be quickly and selectively activated so as to produce incident beams having incident plane at an arbitrary angle with respect to the X-axis of the sample.

As noted above, the number of the illumination sources 102 may be less than the number of available fibers 106. In this case, the illumination sources may be moved so as to be positioned along selected first fiber ends 106a. Any suitable motor mechanism may be utilized to move the illumination sources relative to the fibers. The motor mechanism may be formed from a screw drive and stepper motor, linear drive with feedback position, or band actuator and stepper motor, by way of examples.

Figure 3A:
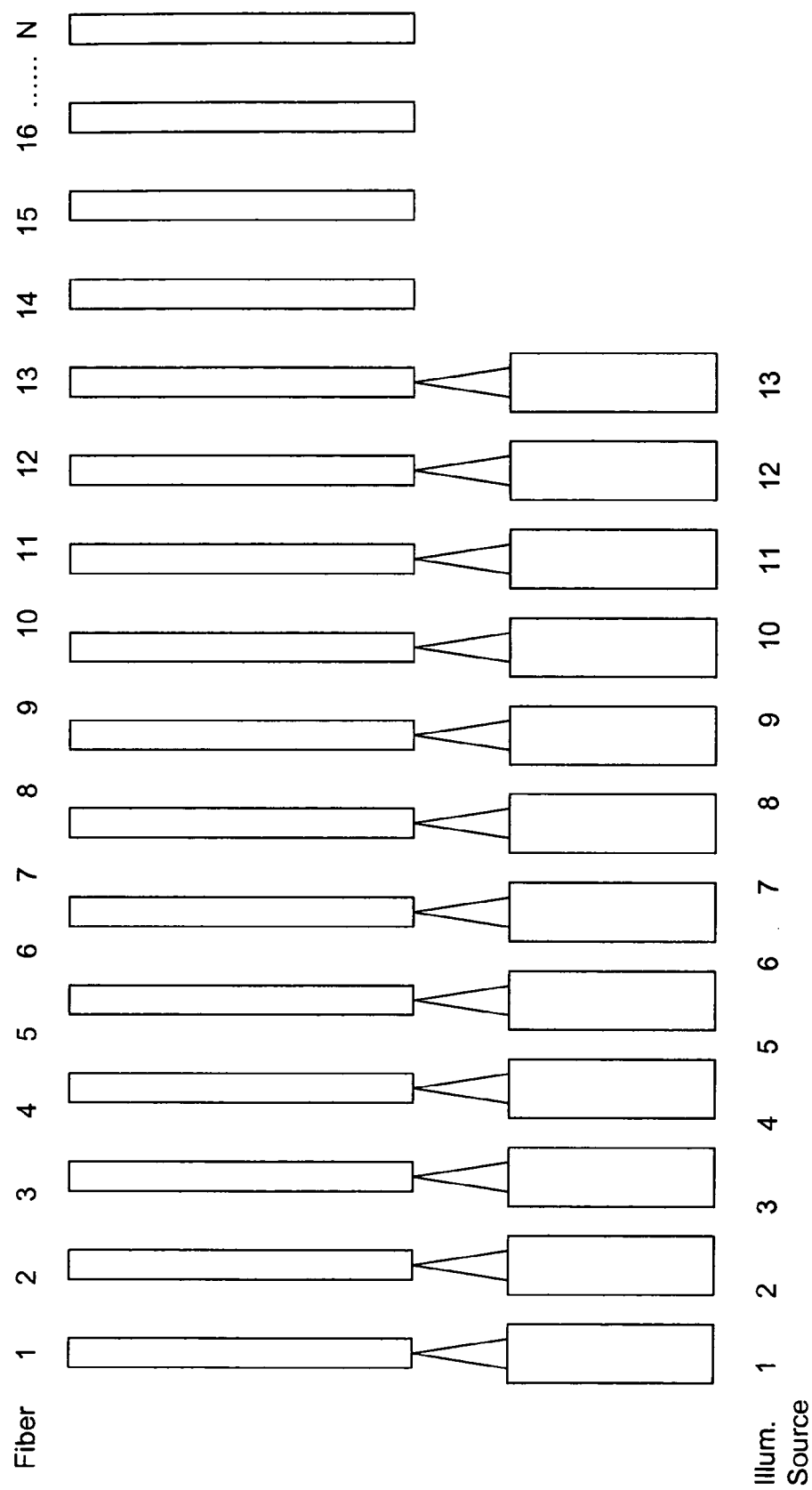
FIG. 3A illustrates an arrangement of illumination sources with respect to a group of fibers in accordance with a first embodiment of the present invention.

FIG. 3A illustrates an arrangement of illumination sources with respect to a group of fibers in accordance with a first embodiment of the present invention. In the example of FIG. 3A, the first fiber ends 106a of FIG. 1 are shown. As shown, the illumination sources 1 through 13 are arranged to cover adjacent fibers 1 through 13, while fibers 14 through N are not covered by a corresponding illumination source. Although a one dimensional arrangement of illumination sources and fibers are shown, these arrangements may be two dimensional when the laser sources are not identical, for example, when the lasers have different wavelengths. In one specific example, a two dimensional arrangement may be necessary so that a lasers cannot "jump over" another adjacent laser. In the illustrated embodiment, the illumination sources may be moved to cover a different set of fibers. For example, the illumination sources 1 through 13 may be moved to cover fibers 2 through 14 or 3 through 15, etc.

Figure 3B:
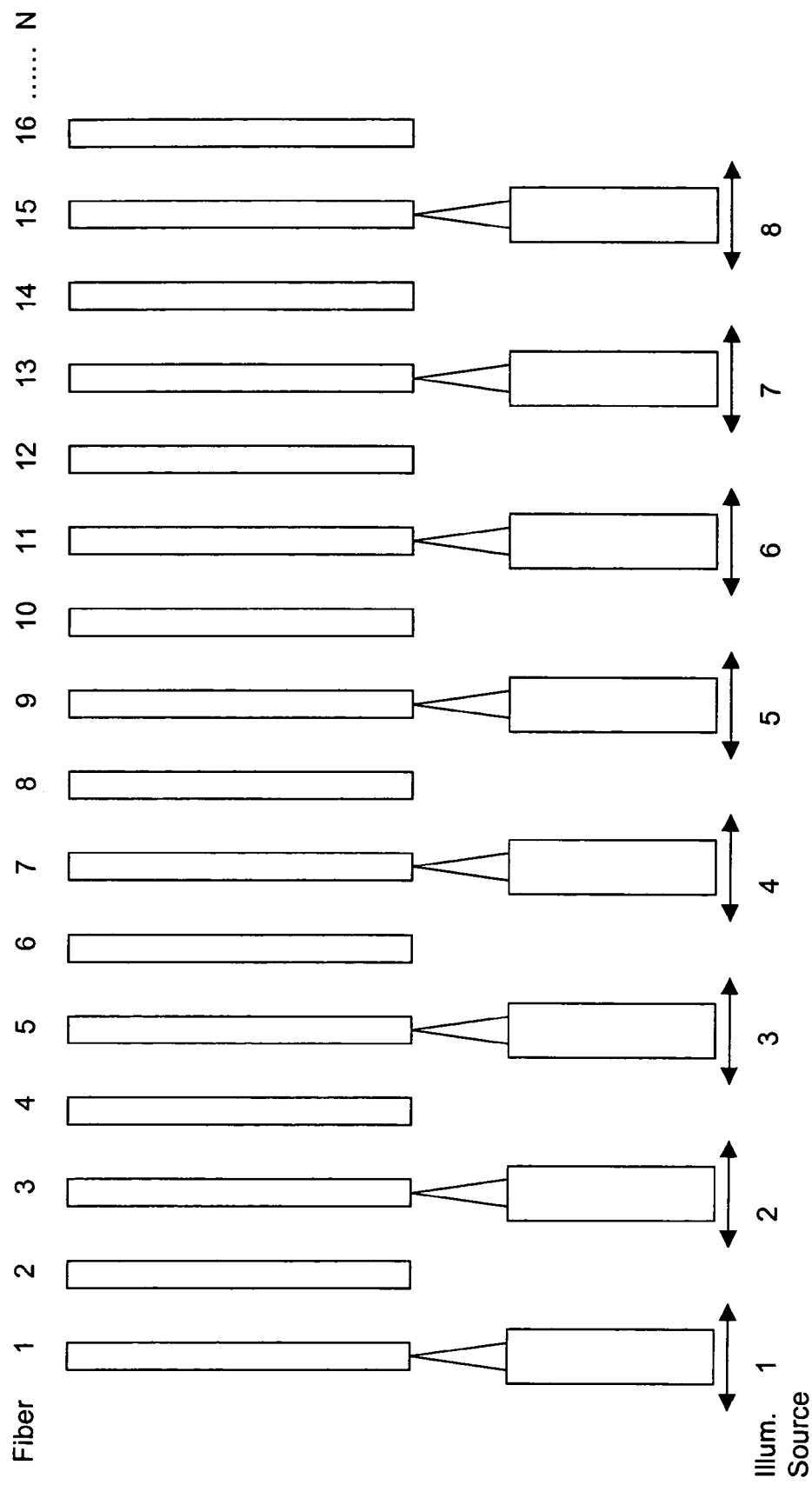
FIG. 3B illustrates an arrangement of illumination sources with respect to a group of fibers in accordance with a second embodiment of the present invention.

The illumination sources may be arranged in any suitable manner with respect to the fibers. FIG. 3B illustrates an arrangement of illumination sources with respect to a group of fibers in accordance with a second embodiment of the present invention. As shown, an illumination source is positioned adjacent to every two fibers. For example illumination source 1 is arranged over fiber 1, while illumination source 2 is arranged over fiber 3. The fiber 2 which is between fibers 1 and 3 is not adjacent to an illumination source in this configuration. These illumination sources may be moved to cover different ones of the fibers. For example illumination source 1 may be moved to cover fiber 2, while illumination source 2 is moved to cover fiber 4, etc. The different arrangements of positioning different lasers to launch light into different fibers produce desired illumination pattern of the second fiber end 106b.

Figure 4A:
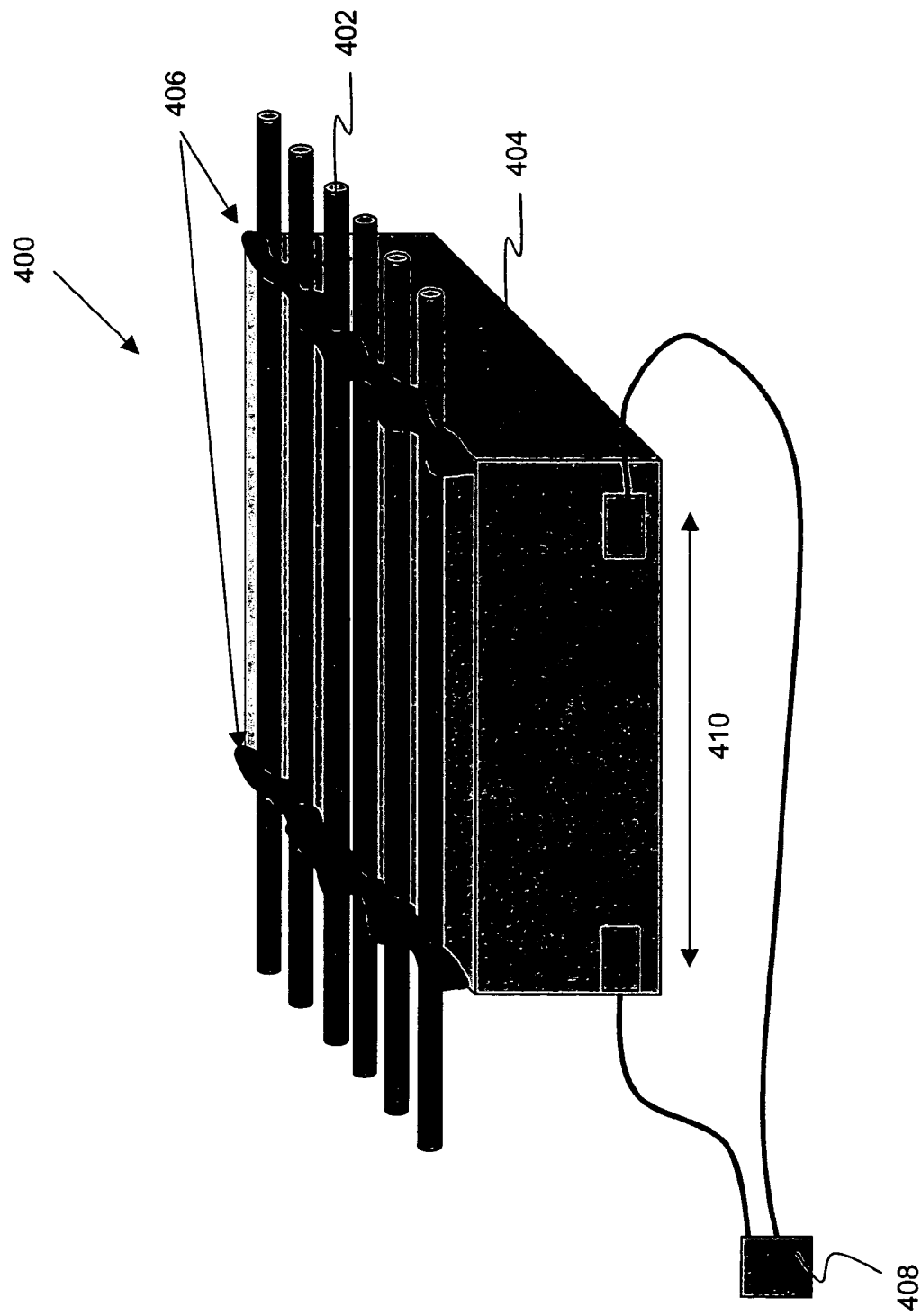
FIG. 4A is a diagrammatic representation of a fiber modulator in accordance with a first embodiment of the present invention.

The fiber modulator 108 of the inspection system 100 of FIG. 1 may take any suitable form for altering the phase of the fiber so as to reduce the speckle in the incident or illumination beams. FIG. 4A is a diagrammatic representation of a fiber modulator 400 in accordance with a first embodiment of the present invention. As shown, a rectangular shaped piezoelectric modulator is coupled to a bundle of fibers 402 via any suitable epoxy 406 (although only a two dimensional portion of the bundle is shown so as to clarify the invention). A voltage source 408 applies a voltage difference to the piezoelectric modulator 404 so as to expand the modulator 404 in directions 410. This expansion of the modulator 408 results in a stretching of the fibers 406.

Figure 4B:
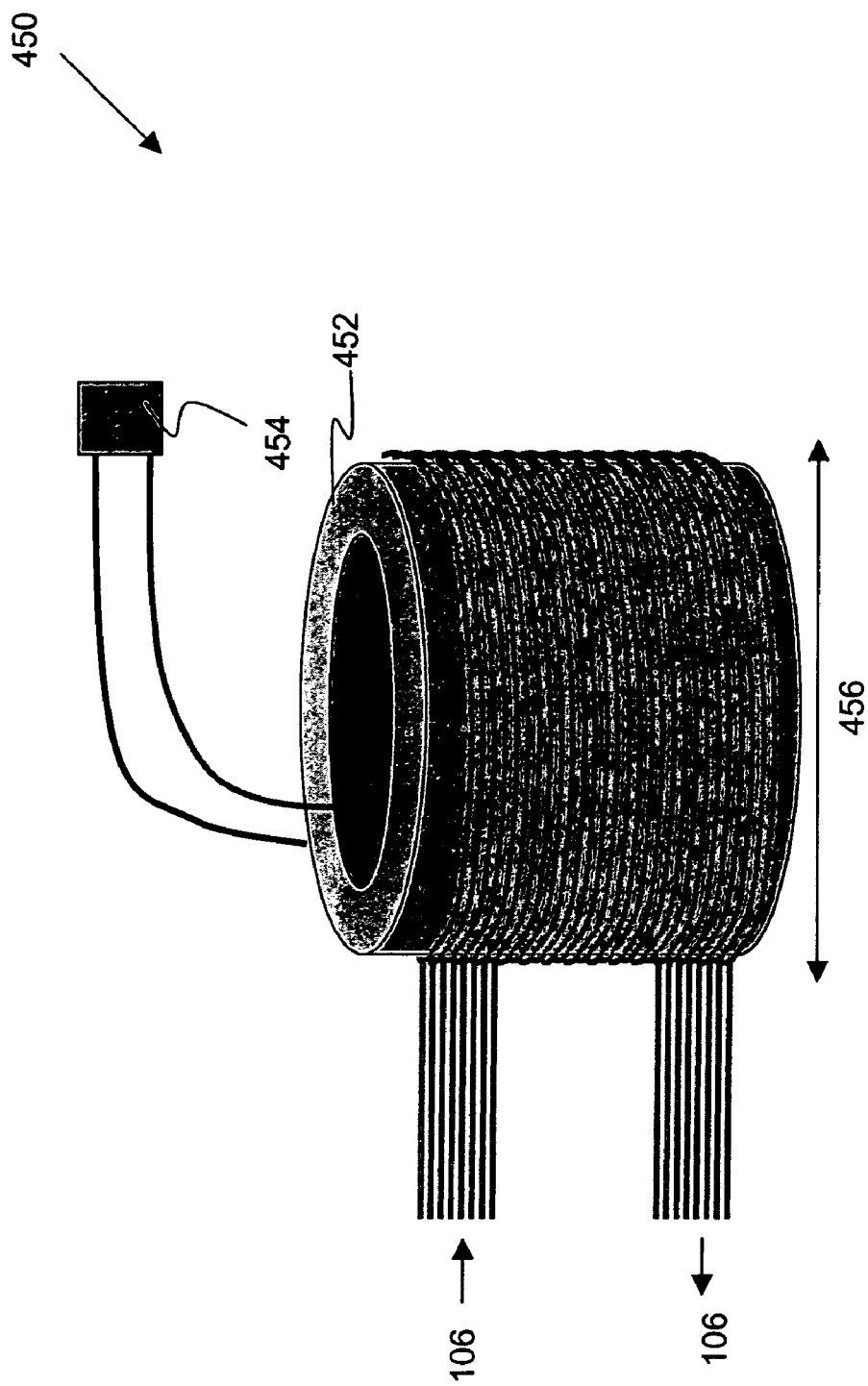
FIG. 4B is a diagrammatic representation of a fiber modulator in accordance with a second embodiment of the present invention.

FIG. 4B illustrates a fiber modulator 450 in accordance with a second embodiment of the present invention. As shown, the fiber modulator is in the form of a tube shaped piezoelectric modulator 452. The fibers 106 are wrapped around the tube shaped modulator 452. A voltage supply 454 applies a voltage difference to the inside and outside of the tube so as to expand the modulator 452 and fibers in directions 456.

The voltage difference for the fiber modulator (e.g., of FIG. 4A or 4B) is generally selected so as to substantially eliminate speckle noise. The voltage difference setting may be determined in any suitable manner, such as experimentation or by modeling. In an experimentation example, the voltage difference is adjusted until the resulting incident beams have minimum speckle noise.

Embodiments of the illumination apparatus described herein provide several advantages. The use of multiple illuminations sources, such as lasers, allows efficient delivery of high brightness illumination to the sample. Lasers with different wavelengths can be efficiently combined. This arrangement is especially suited for dark field inspection, where an increase in light efficiency is highly desired to detect increasingly smaller surface anomalies. Additionally, different imaging and inspection modes (such as bright field and dark field inspection modes) may be readily provided simply by selectively lighting different fibers. The speckle noise may also be effectively reduced by using a fiber modulator without a significant reduction in light efficiency, as compared with using a rotating diffuser.

In one alternative embodiment, a fiber modulator is advantageously used without an illumination selector. In other words, the illumination sources may be set up to permanently transmit onto a fixed set of fibers without being configurable. In this embodiment, the fiber modulator is used to reduce speckle noise in the resulting incident beams which are fixably output by the fibers.

Figure 5:
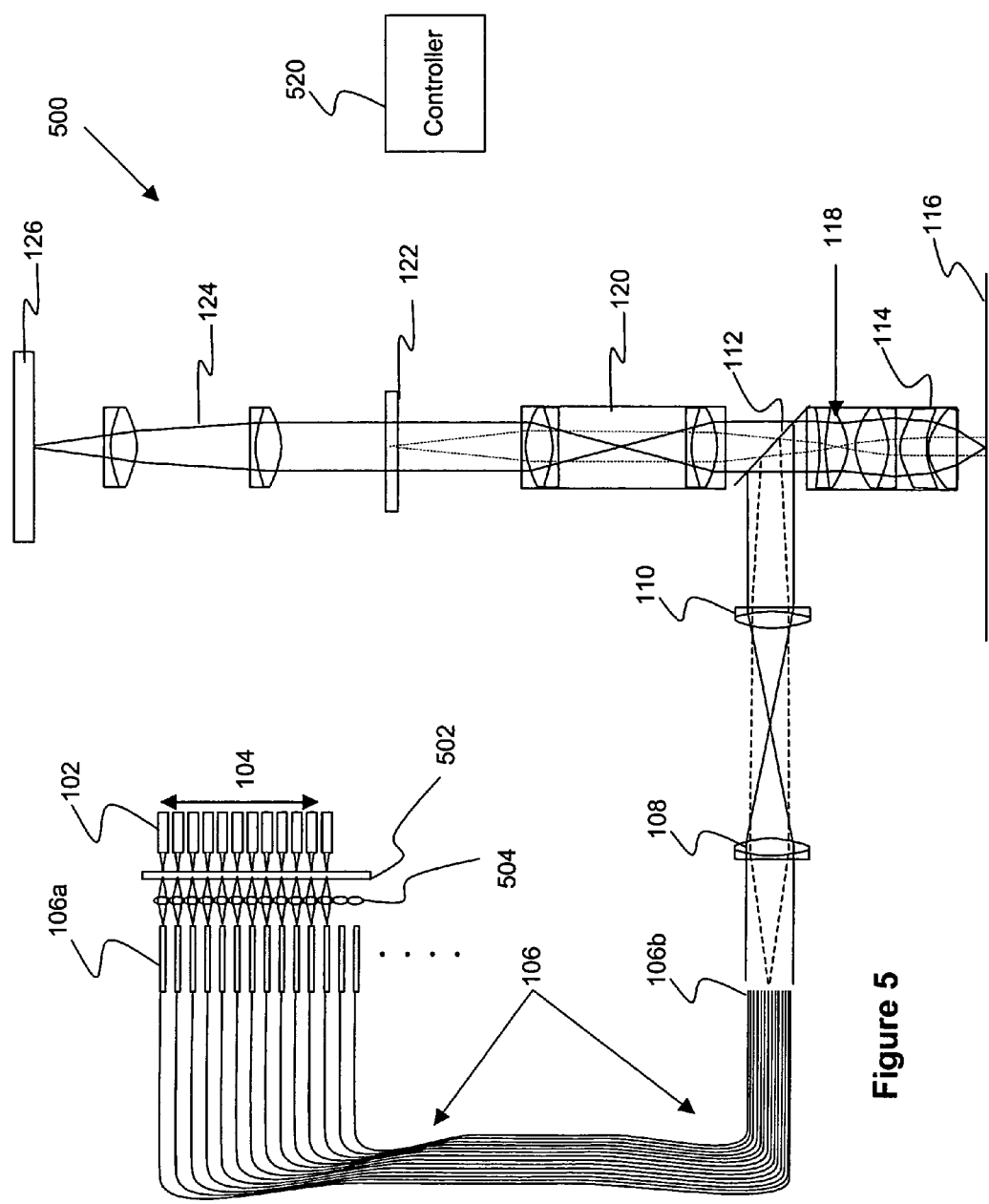
FIG. 5 is a diagrammatic representation of an inspection system in accordance with an alternative embodiment of the present invention.

In embodiments which include an illumination selector, any suitable spatial coherence reduction mechanism may be used in place of the fiber modulator illustrated in FIG. 1. FIG. 5 is a diagrammatic representation of an inspection system 500 in accordance with an alternative embodiment of the present invention. The components of this inspection system 500 are similar to the components of FIG. 1. However, speckle is reduced from the illumination beams by using a rotating diffuser (or a rotating random phase plate) 502, instead of a fiber modulator. In this embodiment, the illumination sources 102 are still configurable to turn on and off. However, the individual incident beams from illumination sources 102 pass through rotating diffuser 502. The rotating diffuser 502 serves to reduce the coherence of the incident beams. A suitable rotating diffuser is a Aurora diffuser available from Digital Optics Corporation located in Charlotte, N.C., USA. The incident beams then pass through an array of lenslets 504 which focus the selected incident beams onto the fiber ends 106a.

In general, the rotating diffuser acts to reduce speckle noise. However, the rotating diffuser also has low light efficiency and may only be used for applications which do not require high light efficiency, such as bright field inspection. Preferably, laser diodes at shorter wavelengths, e.g., 375 or 405 nm, are used as the illumination sources.

Figure 6:
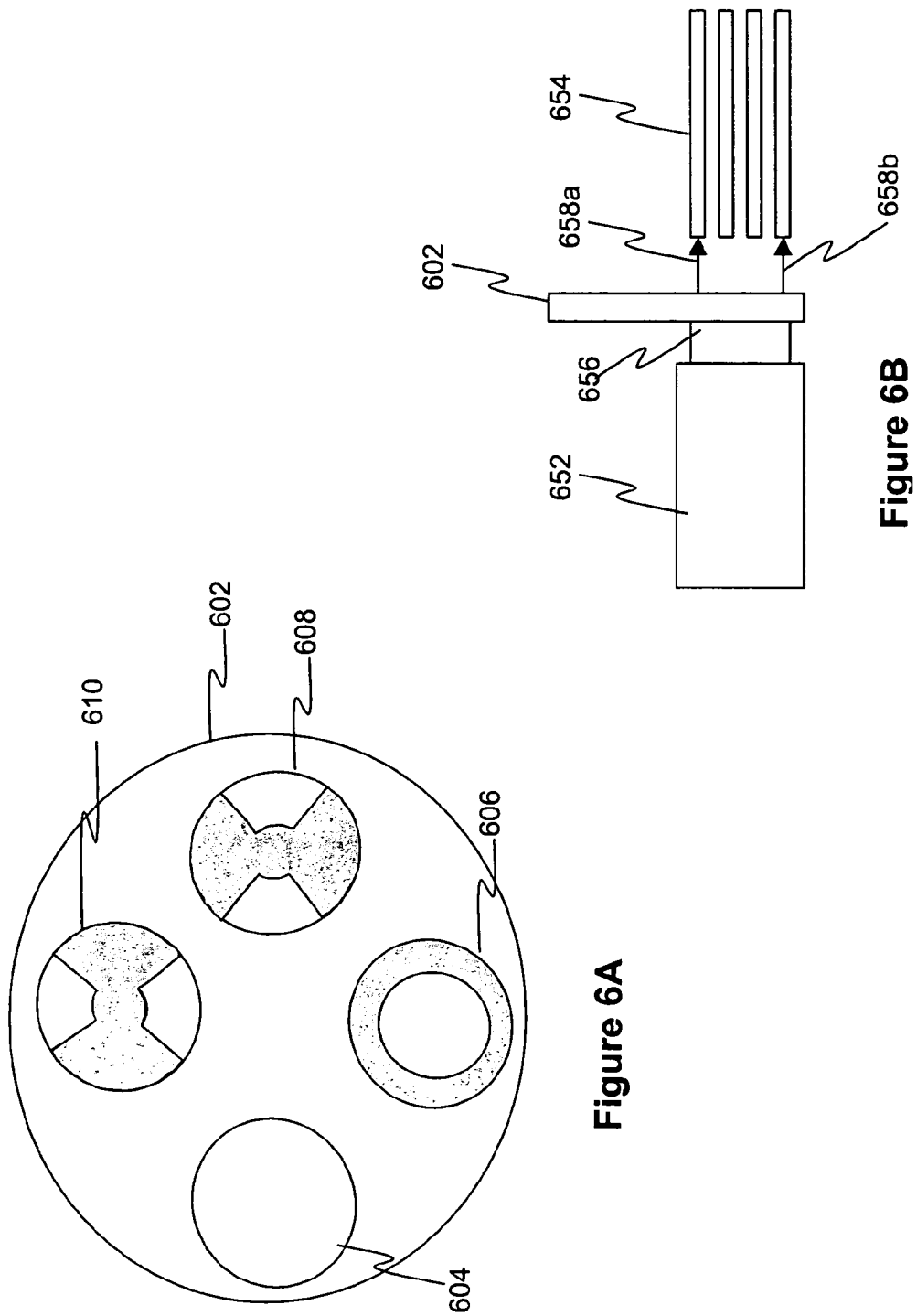
FIGS. 6A and 6B illustrate an illumination selector in accordance with an alternative embodiment of the present invention.

Any suitable mechanism for selectively providing one or more incident beams to impinge on one or more fiber ends may be utilized. FIGS. 6A and 6B illustrate an illumination selector in accordance with an alternative embodiment of the present invention. As shown in FIG. 6B, the illumination selector includes a single incident beam source 652 for generating a single, large incident beam 656.

The resulting single beam 656 then may be passed through a movable substrate 602 which is illustrated in FIG. 6A. The movable substrate includes a plurality of mask areas, where each different mask area has different configurations of transparent and opaque portions. In a simplified example, there are four mask areas 604, 606, 608, and 610. Mask area 604 is totally transparent to allow all of the beam through to then impinge individually on all of the fibers 654. Mask area 606 is transparent along the outer circumference and opaque in the center so as to result in a ring of incident beams into fiber bundle 654. Mask area 604 may be used for bright field inspection, while mask area 606 may be used for dark field inspection. Mask area 608 may result in incident beams at oblique angles along an X-axis, while mask area 610 results in incident beams along a Y-axis.

Figure 7:
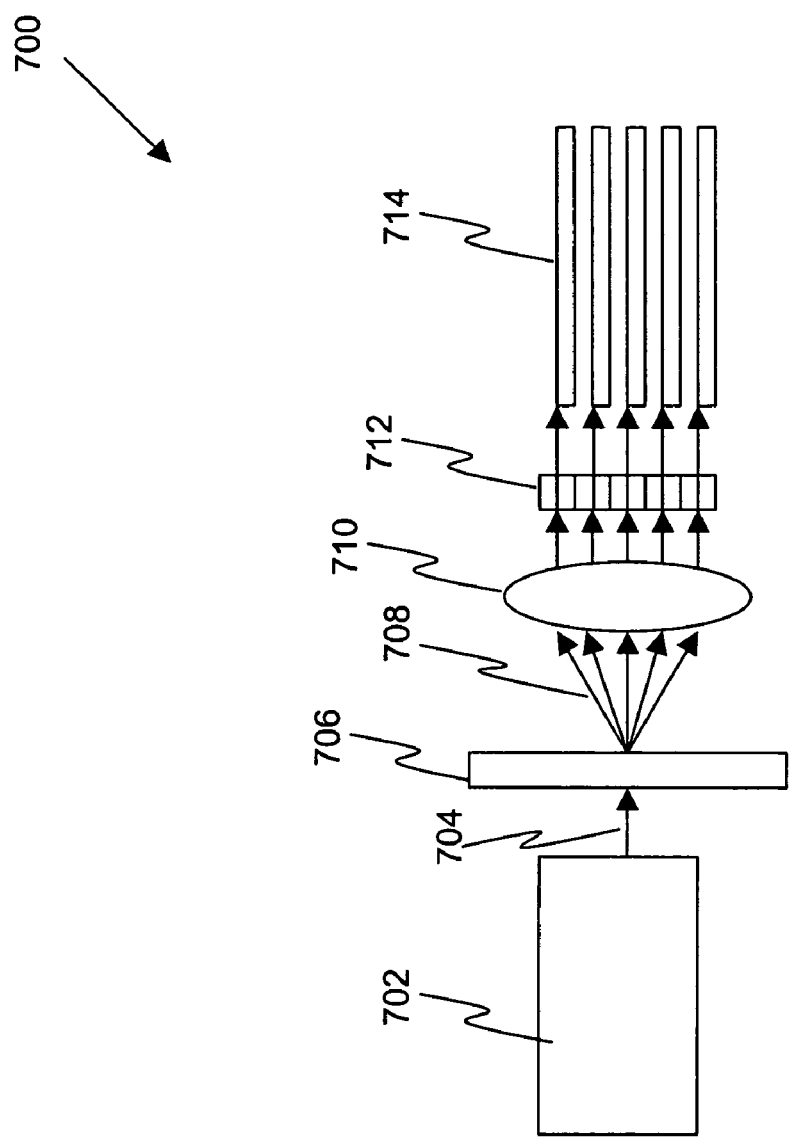
FIG. 7 is a diagrammatic representation of an illumination selector in accordance with a specific implementation of the present invention.

FIG. 7 is a diagrammatic representation of an illumination selector 700 in accordance with another alternative embodiment of the present invention. As shown, a single illumination source 702 generates a single, large beam 704, which is directed onto diffractive optical element (DOE) 706. The DOE generally generates a plurality of incident beams 708 multiple incident angles. Several embodiments of a DOE are described further in U.S. Patent, having U.S. Pat. No. 6,578,961, issued 17 Jun. 2003, entitled "MASSIVELY PARALLEL INSPECTION AND IMAGING SYSTEM", by Mehdi Vaez-Iravani, which patent is incorporated herein by reference in its entirety.

After the plurality of incident beams 708 exit the DOE, a lens (or an array of lenslets) receive the incident beams and direct each of the incident beams onto a corresponding fiber 714. Optionally, each beam may pass through a shutter 712 so that the beam may be turned on or off.

The illumination selector embodiments of FIGS. 6A, 6B, and 7 may also each include any suitable mechanism for substantially eliminating speckle noise, such as a fiber modulator or rotating diffuser as described herein.

The single source light embodiments may utilize any suitable light source. For example, a gas laser generator may be used since it has a relatively large diameter which can be split into multiple beams which fit onto multiple fibers. Of course, any type of light may be used as the single light source, besides a gas laser. However, the beam size may have to be expanded or reduced so that the beams (after they are split) can be coupled into the fibers with optimized efficiency.

In an alternative multiple light source embodiment, deep ultra violet (DUV) lasers may be utilized. DUV lasers generally provide optimum sensitivity for detecting defects on reticles and wafers, for example. Wavelengths of around 200 nm are highly desirable. Current methods of producing light of wavelengths around 200 nm rely on multiple stages for harmonic or sum-frequency generation. These multiple stages generally employ various non-linear crystals. One example technique takes light from a laser operating in the range of 1547 nm and then passes it through five different crystals to produce 193 nm light. Another example technique uses an argon-ion laser operating at 488 nm, creates second-harmonic light at 244 nm with a particular stage crystal and then mixes this light with that from a 1064 nm laser in a another stage crystal to produce 198.45 nm light.

Using multiple stage crystals to produce light at around 200 nm has several disadvantages. Typical multiple stage light generation systems can be about eight feet in length and require about 60 kW of input power for the rather high frequency light sources. In brief, using multiple crystals results in a more complex and expensive and sometimes less reliable and efficient light generation system, as compared with a single stage system.

In a single stage light generation embodiment, a semiconductor laser operating in the wavelength range of about 375 nm~405 nm is used as a light source. In a specific implementation, a GaN-based laser diode (referred to as a "blue laser diode") that currently produces 405 nm is used as a light source. A pulse or continuous type laser may be utilized. Single stage non-linear crystals are then utilized to generate light in the wavelength range of about 187.5 nm to 202.5 nm by a harmonic or sum frequency process. That is, a sum-frequency operation is performed on two outputs of two blue laser diodes or a doubler operation is performed on the output of a single blue laser diode. This light generation mechanism may be scaled up and used with the above described illumination mechanisms of present invention.

Figure 8:
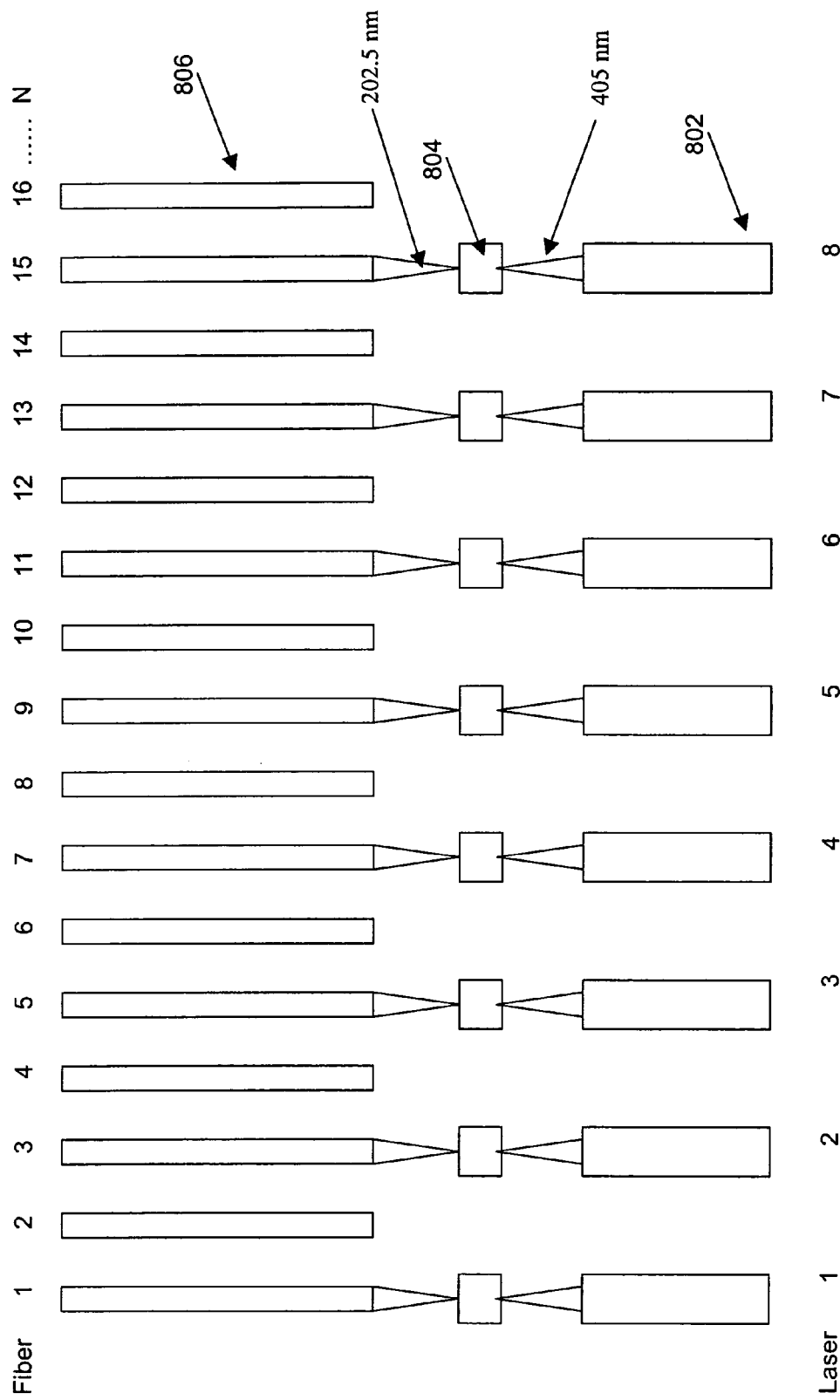
FIG. 8 is a diagrammatic representation of alternative light source mechanisms in accordance with one embodiment of the present invention.

FIG. 8 is a diagrammatic representation of alternative light source mechanisms in accordance with one embodiment of the present invention. As shown, a plurality of blue laser diodes 802 each produce a 405 nm wavelength beam that is then received by a one of a plurality of single stage harmonic generators 804. Each single stage harmonic generator 804 generally provides a frequency doubling operation on the received 405 nm beam. In this embodiment, each harmonic generator 804 outputs a frequency doubled beam at about 202.5 nm, which then enters each fiber 806. In an alternative implementation, the output of two blue laser diodes is received by a sum-frequency stage, which serves to sum the two frequencies.

In the illustrated embodiment, the harmonic generator 804 may take any suitable form for doubling the frequency of the beam output by the corresponding blue laser diode. By way of examples, the harmonic generator 804 may be in the form of an external cavity which also includes a single non-linear crystal or simply in the form of a single non-linear crystal. Each blue laser diode 802 may take any suitable form for generating an optical beam having a wavelength between about 375 nm and about 405 nm. A DL-LS5010 405 nm blue laser diode from Sanyo of Chatsworth, Calif. works well.

Any suitable non-linear crystal may be used to double the frequency of the input optical beam from the blue diode. In one implementation, a KBBF ($KBe_2BO_3F_2$) crystal that is constructed and/or arranged with respect to other external cavity components to double the particular input frequency (e.g., 405 nm) is used. Design factors which affect the frequency doubling capabilities include the optical paths between the crystal and the other external cavity components (if present), crystal and other cavity components composition, the path length through the crystal and other transmissive cavity components, shape and composition of crystal and/or reflector/prism, etc. Techniques for designing KBBF crystals are further described in the following references: (1) T. Kanai et al., "Generation of vacuum-ultraviolet light below 160 nm in a KBBF crystal by the fifth harmonic of a single-mode Ti:sapphire laser", Journal of the Optical Society of America B 21 370-375 (2004), (2) T. Togashi et al., "Generation of vacuum-ultraviolet light by an optically contacted, prism-coupled $KBe_2BO_3F_2$ crystal", Optics Letters 28, 254-256 (2003), and (3) Chuangtian Chen et al., "Second-harmonic generation from a $KBe_2BO_3F_2$ crystal in the deep ultraviolet", Optics Letters 27, 637-639 (2002). These references are incorporated herein by reference. In an alternative implementation, a BBO crystal (beta-BaB2O4) may be utilized. The design factor listed above may also be applied with reference to a BBO crystal so as to double the frequency of the optical beam produced by a blue laser diode.

Figure 9:
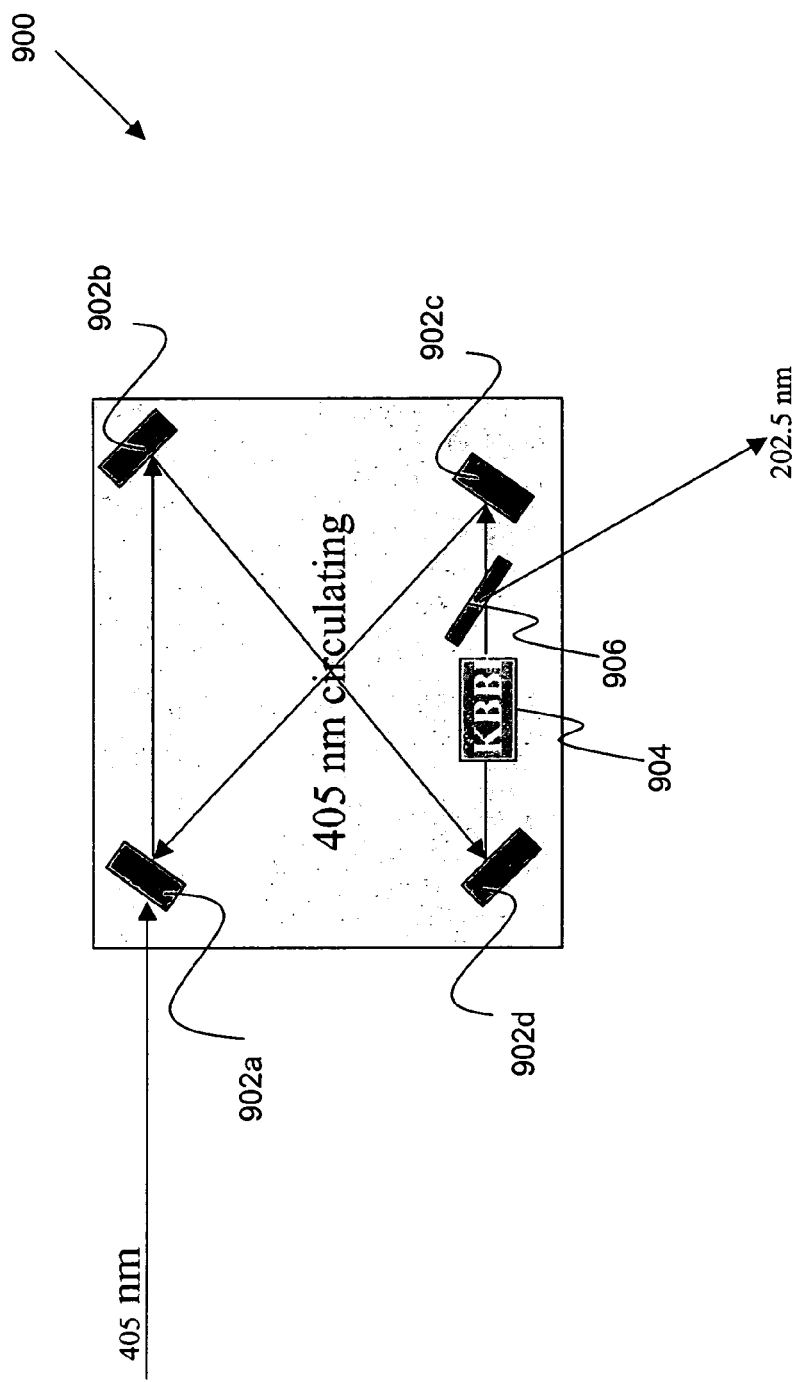
FIG. 9 is a diagrammatic representation of an external cavity, which can be used with the alternative light source of FIG. 8, in accordance with one embodiment of the present invention.

In an external cavity embodiment, any suitably constructed external cavity may be utilized for doubling the frequency of the output beam from a blue laser diode. FIG. 9 is a diagrammatic representation of an external cavity 900, which can be used with the alternative light source of FIG. 8, in accordance with one embodiment of the present invention. In general, the beam from a blue laser diode is received into the external cavity 900 and the external cavity circulates the beam within the external cavity so that the frequency is doubled. This may be accomplished by any suitable arrangement of reflectors, mirrors, or prisms.

In the illustrated implementation, input beam having frequency 405 nm is received by a first reflector 902a which is designed to at least partially transmit the beam to a second reflector 902b. The beam is then reflected by the second reflector 902b to a third reflector 902d. This third reflector then reflects the beam towards a fourth reflector 902c. A KBBF crystal 904 is positioned between the third and fourth reflectors 902d and 902d.

While the beam circulates between the reflectors and passed through the KBBF crystal, the beam's frequency is doubled. A dichroic element 906 is placed between the KBBF crystal 904 and reflector 902c. This element 906 transmits the 405 nm beam to reflector 902c while reflecting a frequency doubled beam (e.g., 202.5 nm) out of the external cavity 900.

These single stage harmonic or sum-frequency light generators that utilize blue lasers and single stage harmonic or sum-frequency components have a number of advantages over multiple stage designs. These single stage harmonic or sum-frequency light generators provide a simpler, more reliable and efficient system as compared with a multiple stage light generator. For the doubling embodiment, a single doubling or sum-frequency stage allows the output of each diode to be doubled in light frequency separately without having to combine the light from several diodes and passing it through a single crystal.

For inspection systems that use partial coherence imaging, multiple laser diodes can be used to generate illumination apertures of any desired shapes. Increasing the number of lasers is also an easy way to obtain higher illumination powers. Multiple lasers can also be modulated either synchronously, randomly, or in some predetermined pattern. Alternatively, a single stage harmonic or sum-frequency light generator may be utilized separately (e.g., in an inspection system) without the illumination selection embodiments described herein.

Although the foregoing invention has been described in some detail for purposes of clarity of understanding, it will be apparent that certain changes and modifications may be practiced within the scope of the appended claims. For example, the light may be selectively transmitted onto the fiber ends simultaneously, sequentially, or in any suitable order. Also, different wavelength illumination sources may be used in the same illumination apparatus. Therefore, the described embodiments should be taken as illustrative and not restrictive, and the invention should not be limited to the details given herein but should be defined by the following claims and their full scope of equivalents.

What is claimed is:

1. An apparatus for illuminating a sample, comprising:
    a plurality of optical fibers that each has a first end and a second end;
    an illumination selector for selectively transmitting one or more incident beams so that the selected one or more incident beams are selectively output from one or more corresponding second ends of the fibers; and
    a lens arrangement for receiving the selected one or more incidents beams output from the corresponding one or more second ends of the fibers and directing the selected one or more incident beams towards the sample,
    wherein the lens arrangement and the fibers are arranged with respect to each other so as to image an imaging plane of the sample at the second ends of the fibers,
    wherein the lens arrangement and the optical fibers are arranged so that each optical fiber results in a specific incident beam at a specific angle being directed towards the sample when the illumination selector selectively transmits the specific incident beam and wherein at least some of the specific angles associated with the optical fibers differ from each other.

2. An apparatus as recited in claim 1, wherein the incident beams are laser beams.

3. An apparatus as recited in claim 1, wherein the illumination selector comprises:
    a plurality of illumination sources, wherein each illumination source is positioned at a corresponding first end of a one of the fibers and each illumination source is configurable to turn off or on so as to selectively transmit one or more incident beams; and
    a controller operable to selectively turn the illumination sources on or off.

4. An apparatus as recited in claim 1, wherein the illumination selector comprises:
    a plurality of illumination sources, wherein each illumination source is configurable to turn off and on and a number of the illumination sources is less than a number of the fibers;
    a movement mechanism for positioning each of the illumination sources near a one of the first ends of the fibers; and
    a controller operable to selectively turn the illumination sources on or off and to cause the movement mechanism to position the illumination sources at selected first ends of the fibers so as to selectively transmit one or more incident beams.

5. An apparatus as recited in claim 1, wherein the illumination selector comprises:
    a single beam generator for outputting a single incident beam;
    a movable substrate comprising a plurality of mask areas, wherein each different mask area includes a different set of transparent and opaque portions and each mask area is sized to cover a substantial portion of the single incident beam's cross section;
    a movement mechanism for moving the movable substrate so as to position a selected one of the mask areas of the substrate over the single incident beam's cross section; and
    a controller operable to cause the movement mechanism to position a selected one of the mask areas of the substrate over the incident beam's cross section so as to selectively transmit one or more incident beams.

6. An apparatus as recited in claim 5, wherein the single beam generator is a gas laser generator.

7. An apparatus as recited in claim 1, wherein the illumination selector comprises:
    a single beam generator for outputting a single incident laser beam;

a diffractive optical element for receiving the single incident beam and outputting a plurality of incident beams;

a lens element for receiving the incident beams and directing them each towards a one of the first fiber ends;

a plurality of shutters for receiving the incident beams and configurable to a closed and an open position; and a controller operable to open or close one or more selected shutters so as to selectively transmit one or more incident beams.

8. An apparatus as recited in claim 7, wherein the lens element is an array of lenslets.

9. An apparatus as recited in claim 1, wherein the sample is select a semiconductor device, a semiconductor wafer, or a semiconductor reticle.

10. An apparatus as recited in claim 1, further comprising a fiber modulator for altering the length of the fibers so as to reduce speckle noise in the one or more incident beams.

11. An apparatus as recited in claim 10, wherein the fiber modulator is a piezoelectric modulator coupled to a portion of the fibers having a voltage generator for applying a voltage difference across the piezoelectric modulator to selectively altering a size of the piezoelectric modulator and thereby stretch the coupled fibers.

12. An apparatus as recited in claim 11, wherein the piezoelectric modulator is rectangular shaped and coupled to the fibers with epoxy.

13. An apparatus as recited in claim 11, wherein the piezoelectric modulator has a tube shape around which the fibers are wrapped.

14. An inspection system for inspecting a sample, comprising:

the apparatus as recited in claim 11;

a second lens arrangement for directing one or more output beams emanating from the sample in response to the selected one or more incident beams; and a detector for receiving the one or more output beams and generating an image or signal based on the one or output beams.

15. An inspection system as recited in claim 14, wherein the controller is further operable to analyze the image or signal from the detector to thereby determine whether the sample has any defects.

16. An inspection system as recited in claim 15, wherein the controller is further operable to analyze the image or signal from the detector to thereby characterize the sample.

17. An inspection system of claim 15, further comprising an illumination source for directing a single incident beam towards the sample, wherein the illuminator source is configurable on or off.

18. An inspection system of claim 14, wherein the second lens arrangement includes an imaging aperture that is configurable to transmit selected portions of the output beams' profile.

19. An inspection system of claim 18, wherein in the imaging aperture is configurable to either transmit all of the output beams or to transmit only a nonspecular portion of the output beams, and wherein the illumination selector is operable to either transmit all of the incident beams onto all of the first fiber ends or to transmit an outer ring portion of the incident beams which are suitable for a dark field mode inspection onto an outer ring portion of first fiber ends.

20. An apparatus as recited in claim 1, further comprising a rotating diffuser for receiving the incident beams and outputting the incident beams with altered phases so as to reduce speckle noise in the incident beams.

21. An apparatus as recited in claim 1, wherein the fibers form a tube having a circular shaped cross section.

22. An apparatus as recited in 1, further comprising:

a plurality of light generators for producing the incident beams each having a wavelength between about 375 nm and about 405 nm; and a plurality of single stage non-linear crystals that are each positioned for receiving a corresponding one or two of the incident beams from a corresponding one or two of the light generators, each crystal being arranged to either (i) double the frequency of the received corresponding one incident beam or (ii) sum the frequencies of the received corresponding two incident beams, so as to achieve a wavelength between about 187.5 nm and about 202.5 nm and then output the incident beam towards the illumination selector.

23. An apparatus as recited in claim 22, wherein the light generators are GaN-based laser diodes.

24. An apparatus as recited in claim 22, wherein the light generators are pulse type lasers.

25. An apparatus as recited in claim 22, wherein the light generators are continuous type lasers.

26. An apparatus as recited in claim 22, wherein each crystal is positioned to receive one corresponding incident beam and arranged to double the frequency of the received corresponding one incident beam to achieve a wavelength between about 187.5 nm and about 202.5 nm and then output the incident beam towards the illumination selector.

27. An apparatus as recited in claim 26, wherein each crystal is part of an external cavity having a plurality of reflectors or prisms positioned to circulate the one corresponding incident beam between the reflectors or prisms and a dichroic element for transmitting at least a portion of the circulating one corresponding incident beam and for reflecting the incident beam having a wavelength between about 187.5 nm and about 202.5 nm towards the illumination selector and wherein the each crystal is positioned within a path of the circulating one corresponding incident beam.

28. An apparatus as recited in claim 22, wherein each crystal is positioned to received two of the corresponding incident beams and is arranged to sum the frequencies of the received corresponding two incident beams to achieve a wavelength between about 187.5 nm and about 202.5 nm and then output the incident beam towards the illumination selector.

29. An apparatus as recited in claim 22, wherein each crystal is a KBBF ($KBe_2BO_3F_2$) crystal.

30. An apparatus as recited in claim 22, wherein each crystal is a BBO (beta-$BaB_2O_4$) crystal.

31. A method for illuminating a sample, comprising:

selectively transmitting one or more incident beams so that the selected one or more incident beams are selectively output from one or more corresponding second ends of the fibers; and directing the selected one or more incident beams output from the second ends of the fibers towards the sample, wherein each optical fiber results in a specific incident beam at a specific angle being directed towards the sample when the specific incident beam is selectively transmitted and wherein at least some of the specific angles associated with the optical fibers differ from each other.

32. A method as recited in claim 31, wherein selectively transmitting one or more incident beams comprises configuring on or off selected one or more illumination sources positioned at corresponding first ends of the fiber.

33. A method as recited in claim 32, further comprising altering a length of the fibers so as to reduce speckle noise in the one or more incident beams.

34. A method as recited in claim 33, further comprising
   directing one or more output beams emanating from the sample in response to the selected one or more incident beams; and
   receiving the one or more output beams at a detector and generating an image or signal based on the one or output beams.

35. A method as recited in claim 34, further comprising analyzing the image or signal from the detector to thereby determine whether the sample has any defects.

36. A method as recited in claim 34, further comprising analyzing the image or signal from the detector to thereby characterize the sample.

37. A method as recited in claim 34, further comprising transmitting only selected portions of the output beams' profile.

38. An apparatus for inspecting a sample, comprising:
   a plurality of optical fibers that each has a first end and a second end;
   a plurality of illumination sources, wherein each illumination source is positioned at a corresponding first end of a one of the fibers and each illumination source is configurable to turn off or on so that one or more incident beams are selectively transmitted so that the selected one or more incident beams are selectively output from one or more corresponding second ends of the fiber;
   a fiber modulator for alter the length of the fibers so as to reduce speckle noise in the selected one or more incident beams;
   a first lens arrangement for receiving the selected one or more incidents beams selectively output from the corresponding one or more second ends of the fibers and directing the selected one or more incident beams towards the sample, wherein the first lens arrangement and the optical fibers are arranged so that each optical fiber results in a specific incident beam at a specific angle being directed towards the sample when the corresponding illumination source is turned on to selectively transmit the specific incident beam and wherein at least some of the specific angles associated with the optical fibers differ from each other;
   a second lens arrangement for directing one or more output beams emanating from the sample in response to the selected one or more incident beams;
   a detector for receiving the one or more output beams and generating an image or signal based on the one or output beams; and
   a controller operable to selectively turn the illumination sources on or off so as to selectively transmit one or more incident beams and to analyze the image or signal from the detector to characterize the sample, the controller being further operable to configure the fiber modulator so as to reduce speckle noise in the selected one or more incident beams.

39. An apparatus for illuminating a sample, comprising:
   a plurality of optical fibers that each have a first end and a second end;
   a plurality of illumination sources each adjacent to a corresponding first fiber end and being operable to transmit an incident beam onto the corresponding first fiber end so that the incident beam is output from the corresponding second fiber end;
   a lens arrangement for receiving the incidents beams output from the second fiber ends and directing the incident beams towards the sample, wherein the lens arrangement and the fibers are arranged with respect to each other so as to image an imaging plane of the sample at the second ends of the fibers;
   a fiber modulator for altering the length of the fibers so as to substantially eliminate speckle noise in the one or more incident beams; and
   a controller operable to configure the fiber modulator to substantially eliminate speckle noise in the one or more incident beams.

40. An apparatus as recited in claim 39, wherein the fiber modulator is a piezoelectric modulator coupled to a portion of the fibers having a voltage generator for applying a voltage difference across the piezoelectric modulator to selectively altering a size of the piezoelectric modulator and thereby stretch the coupled fibers.

41. An apparatus as recited in claim 40, wherein the piezoelectric modulator is rectangular shaped and coupled to the fibers with epoxy.

42. An apparatus as recited in claim 40, wherein the piezoelectric modulator has a tube shape around which the fibers are wrapped.

43. An apparatus for inspecting a specimen, comprising:
   one or two light generators for producing one or two generated beams each having a wavelength between about 375 nm and about 405 nm;
   a single stage non-linear crystal that is arranged to either (i) receive one generated beam from one light generator and double the frequency of the one generated beam or (ii) receive two generated beams from two light generators and sum the frequencies of the two generated beams, the single stage non-linear crystal being further arranged to output an incident beam having a wavelength between about 187.5 nm and about 202.5 nm towards the illumination selector;
   a second lens arrangement arranged to receive the incident beam from the single stage non-linear crystal and direct the incident beam towards the specimen;
   a second lens arrangement for directing one or more output beams emanating from the specimen in response to the incident beam; and
   a detector for receiving the one or more output beams and generating an image or signal based on the one or output beams.

* * * * *